(12) United States Patent
Govyadinov et al.

(10) Patent No.: US 7,079,300 B1
(45) Date of Patent: Jul. 18, 2006

(54) THERMO-MECHANICALLY ACTUATED REFLECTIVE STRUCTURE

(75) Inventors: Alexander Govyadinov, Corvallis, OR (US); Curt N. Van Lydegraf, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/045,710

(22) Filed: Jan. 27, 2005

(51) Int. Cl.
*G02F 1/01* (2006.01)
(52) U.S. Cl. ...................................... 359/288; 359/238
(58) Field of Classification Search ............... 359/223, 359/224, 290, 291, 849
See application file for complete search history.

(56) References Cited

U.S. PATENT DOCUMENTS

| 6,275,325 | B1* | 8/2001 | Sinclair ...................... 359/291 |
| 6,366,414 | B1 | 4/2002 | Aksyuk et al. |
| 6,428,173 | B1 | 8/2002 | Dhuler et al. |
| 6,587,612 | B1 | 7/2003 | Mitchell et al. |
| 6,647,164 | B1* | 11/2003 | Weaver et al. ................. 385/16 |
| 2004/0075881 | A1* | 4/2004 | Ishikawa et al. ............ 359/223 |
| 2004/0114259 | A1* | 6/2004 | Ishizuya et al. ............ 359/849 |
| 2004/0236223 | A1* | 11/2004 | Barnes et al. ............... 600/459 |

\* cited by examiner

*Primary Examiner*—Timothy Thompson
*Assistant Examiner*—Jerry Fang

(57) ABSTRACT

One embodiment of an optical modulator includes a substrate, a reflective structure, and at least three thermally actuated supports that movably support said reflective structure on said substrate.

33 Claims, 1 Drawing Sheet

THERMO-MECHANICALLY ACTUATED REFLECTIVE STRUCTURE

BACKGROUND

Optical devices, such as optical modulators, may include one or more movable members, such as one or more movable reflective plates, positioned on a substrate. The movable reflective plate may be moved between a first position and a second position such that light impinging thereon will be reflected from the plate in one of two predetermined directions. It may be desirable to move the plate into three or more positions so that light reflected from the plate may be directed to one of a variety of projection systems or light dump structures.

DETAILED DESCRIPTION OF THE DRAWINGS

Figure 1:
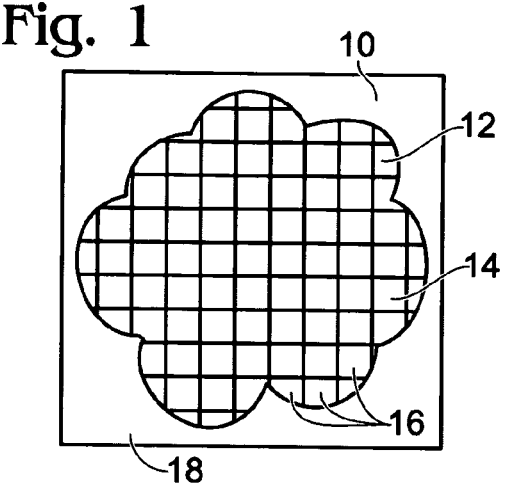
FIG. 1 is a schematic top view of an optical modulator including an array of movable reflective structures.

FIG. 1 is a schematic top view of an optical device 10, such as a projection system, a digital camera, or the like. Optical device 10 includes an optical modulator 12 that may include an array 14 of movable reflective structures 16. In one embodiment, each of reflective structures 16 defines a pixel, and array 14 includes at least one million pixels (one megapixel). Reflective structures 16 may be movably mounted on a substrate 18 such that light impinging on reflective structures 16 are reflected in one of a number of different directions.

Figure 2:
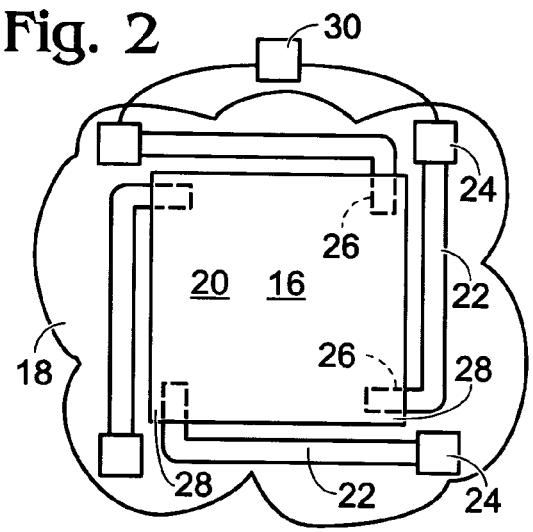
FIG. 2 is a schematic top view of one embodiment of a movable reflective structure.

FIG. 2 is a schematic top view of one embodiment of a movable reflective structure 16. In this embodiment, reflective structure 16 defines a rectangular plate 20, such as a micro-mirror, supported on substrate 18 by four supports 22. In other embodiments, movable reflective structure 16 may define any shape of reflective structure, such as a square, an oval, a hexagon, or the like, and may include at least three supports 22. Supports 22 may be secured to substrate 18 at a contact pad 24 and may be secured to an underside of plate 20 in contact regions 26. In the embodiment shown, four contact regions 26 are shown evenly spaced at the four corners 28 of plate 20. In other embodiments, contact regions 26 may be positioned at any location on reflective structure 16.

Each of contact pads 24 may be operatively connected to a temperature modulating device, such as a heater 30, that operates to individually, selectively heat (or cool, as the case may be) each of supports 22 to a desired predetermined temperature. In one embodiment heater 30 is a complimentary metal oxide semiconductor (CMOS) that operates to heat each of supports 22 by applying a voltage across corresponding pad 24. In such an embodiment, heater 30 may be a voltage source. Each of supports 22 may be secured to substrate 18 only at contact pad 24 such that upon heating by heater 30 supports 22 moves, thereby moving plate 20 from an initial first position into a desired, predetermined second position. Each of supports 22 may be individually, selectively moved a unique amount such that plate 20 may be tilted into a number of different tilt positions with respect to the x, y, and z axes.

Figure 3:
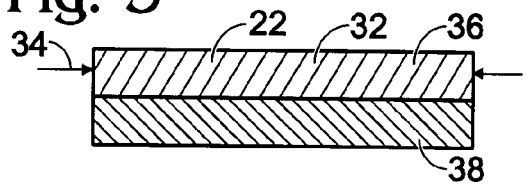
FIG. 3 is schematic cross-sectional side view of one embodiment of a multi-layer support for one embodiment of a movable reflective structure.

FIG. 3 is schematic cross-sectional side view of one embodiment of a multi-layer support 22 for one embodiment of movable reflective structure 16. In this embodiment, support 22 defines an elongate member 32 having a length 34. Support 22 includes a multilayered stack, including a first layer 36 of a first material and second layer 38 of a second material. The first material of first layer 36 may possess a first coefficient of thermal expansion and the second material of second layer 38 may possess a second coefficient of thermal expansion different from the first coefficient of thermal expansion. For example, the first and second layers may each be manufactured of one of plastic, metal, semiconductor material, ceramic, or silicon. In particular, in one embodiment, first layer 36 may be manufactured of copper and may have a coefficient of thermal expansion of $16.5 \times 10^{-6}/°$ K and second layer 38 may be manufactured of plastic and have a coefficient of thermal expansion of $150 \times 10^{-6}/°$ K (for a polyimide). Due to the mismatch of the coefficient of thermal expansion between the two layers 36 and 38, when support 22 is subjected to heat, the first and second layers 36 and 38 each expand at a different rate or in a different amount, such that elongate member 32 moves from a nominal flat orientation (as shown) into a bent or arced orientation (see FIG. 5). Movement of support 22 from the nominal, flat orientation to the bent orientation may be effected by subjecting support 22 to a change in temperature in a range of one to four hundred degrees Kelvin, for example, and may take place in a time period of less than 250 nanoseconds.

In another embodiment, support 22 may define a bent nominal orientation wherein subjecting the support to heat may move the support into a flat orientation. In still another embodiment, support 22 may define a first bent nominal orientation wherein subjecting the support to heat may move the support into a second bent orientation. In still other embodiments, support 22 may include more than two layers, such as three or four layers, and may include layers that extend only along a portion of length 34. Accordingly, any multi-layered arrangement of materials having coefficients of thermal expansion different from one another may be utilized in an embodiment of the present invention. Moreover, the arrangement, dimensions and other similar variables of the multilayered support 22 may be varied to suit a particular application.

Figure 4:
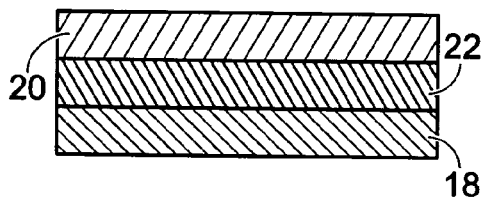
FIG. 4 is a schematic cross-sectional side view of one embodiment of a movable reflective structure in a nominal, first position.

FIG. 4 is a schematic cross-sectional side view of one embodiment of a movable reflective structure 16, such as plate 20, in a nominal, first position. In this position support 22 is unbent and is positioned downwardly against substrate 18. Due to the flat orientation of support 22, plate 20 is positioned downwardly against support 22. In this nominal orientation, no heat is applied to support 22.

Figure 5:
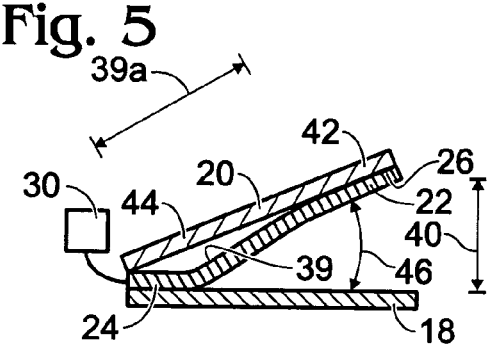
FIG. 5 is a schematic cross-sectional side view of one embodiment of the movable reflective structure of FIG. 4 moved to a second position.

FIG. 5 is a schematic cross-sectional side view of one embodiment of the movable plate 20 of FIG. 4 thermally actuated to a second position upon the application of heat to support 22 by heater 30 through contact pad 24. In one embodiment, heater 30 may be a 5×7 micrometer tungsten heater utilizing power in a range of 0.1 to 2.5 microwatts per degree Kelvin temperature increase. In this embodiment contact region 26 of support 22 has moved upwardly through a distance 40 such that a first end 42 of plate 20 is raised a distance 40 from the nominal position and defines an arc 39 having in which length 39a is in the range of one to ten nanometers. In general, an amount of the bend of supports 22 may be proportional to a temperature to which each support is heated.

In the example shown, two of supports 22 have moved upwardly through distance 40 such that first end 42 of plate 20 is moved upwardly with respect to substrate 18 and such that a second end 44 of plate 20 remains proximate with substrate 18. Accordingly, heating two of supports 22 to a substantially similar temperature over a substantially similar time period allows plate 20 to be tilted to a desired angle 46, such as an angle 46 in a range of greater than zero degrees and up to 180 degrees. In the embodiment shown, angle 46 is in the range of one to forty-five degrees. In another embodiment, supports 22 may be cooled such that the coefficient of thermal expansion may result in movement of plate 20 into a desired predetermined position. In such an embodiment, the temperature modulating device may act to cool one or more of supports 22.

Support 22, as shown in FIGS. 4 and 5, for ease of illustration, does not show its multilayer structure. However, support 22 is understood to have a multilayer structure including materials having different coefficients of thermal expansion such as including tungsten or any other electrically resistive pathway.

Figure 6:
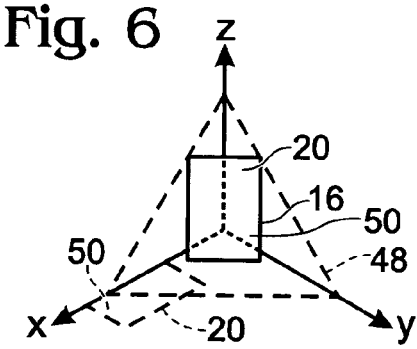
FIG. 6 is schematic cross-sectional side view of one embodiment of a movable reflective structure moved, with respect to the x, y and z axes, from a nominal position.

FIG. 6 is schematic cross-sectional side view of one embodiment of a movable reflective structure 16, such as a plate 20, moved, with respect to the x, y and z axes, from a nominal position (shown in dash lines, parallel to the x-y plane). Such movement may be referred to as a "complex angle" in that a plane 48 defined by a top surface 50 of plate 20 may be angled with respect to the x-y plane, the x-z plane and the y-z plane. To achieve such complex angles, each of supports 22 (not shown in this figure) may be heated to a unique temperature, i.e., each of four supports 22 may be heated to a temperature different than the remaining three supports. In a three support embodiment, all three supports are heated to a temperature different from the remaining two supports. In another embodiment, three supports may each be heated to the same temperature but may be manufactured of different materials from one another such that each support moves through a distance or in a direction different than the remaining supports. Accordingly, by providing a reflective structure 16 having three or more supports 22 that are each individually heated, or including different materials, the reflective structure 16 can be positioned at any complex angle or position with respect to the x, y and z axes. The reflective structure 16, therefore, may reflect light in any desired, predetermined direction and may define a variety of reflection directions. Because plate 20 may be moved by supports 22 into any one of a substantially infinite number of positions, light reflected from plate 20 may be directed along any one of a variety of light paths, such as along paths leading to a variety of different projection systems and/or a variety of light dump locations.

Figure 7:
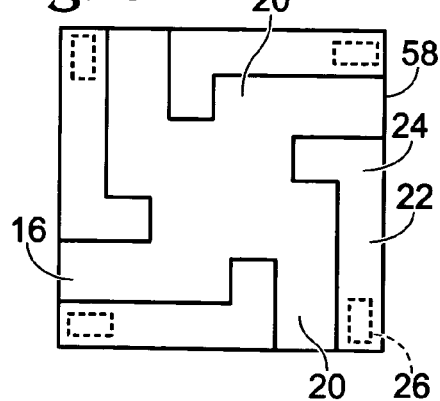
FIGS. 7 and 8 are schematic bottom views of other embodiments of a movable reflective structure.

FIG. 7 is a schematic bottom view of another embodiment of a movable reflective structure 16. In this bottom view the mirror is located on the opposite side than the side shown in the figure. Supports 22, including contact pads 24 (substrate 18 is not shown in this embodiment) and contact regions 26, are contained substantially completely within a perimeter 58 of plate 20 such that multiple plates 20 can be positioned substantially directly adjacent one another so as to provide an optical device with substantially no gap between adjacent pixels or sub-pixels.

Figure 8:
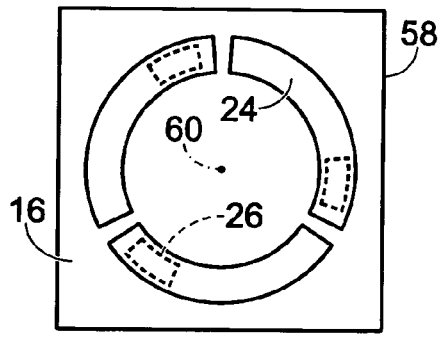

FIG. 8 is a schematic bottom view of another embodiment of a movable reflective structure 16. In this embodiment, supports 22 are nominally curved, and may be symmetrically curved about a central axis 60 of reflective structure 16. When heated, the supports may tend to straighten along their length or may tend to curve inwardly toward central axis 60 of reflective structure 16. Accordingly, in either case, heating of supports 22 may provide rotational movement to reflective structure 16 about central axis 60.

In conclusion, while the present invention has been particularly shown and described with reference to the foregoing embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

We claim:

1. An optical modulator, comprising:
a substrate;
a reflective structure; and
at least four thermally actuated supports that movably support said reflective structure on said substrate, wherein said at least four thermally actuated supports each comprise a first material having a first coefficient of thermal expansion and a second material having a second coefficient of thermal expansion different from said first coefficient of the thermal expansion.

2. The modulator according to claim 1 wherein said reflective structure comprises a mirror.

3. The modulator according to claim 1 wherein said first and second materials are each chosen from the group of plastic, metal, semiconductor material, ceramic, and silicon.

4. The modulator according to claim 1 wherein said first material comprises a first layer, and wherein said second material comprises a second layer positioned on and extending along said first layer.

5. The modulator according to claim 1 further comprising a temperature modulating structure coupled to each of said at least four thermally actuated supports to individually heat each of said supports to a predetermined temperature.

6. The modulator according to claim 5 wherein said temperature modulating structure comprises a complimentary metal oxide semiconductor.

7. The modulator according to claim 1 wherein thermally actuating said at least four thermally actuated supports moves said reflective structure, wherein said movement is chosen from at least one of tilting movement and rotational movement.

8. An optical modulator, comprising:
a substrate;
a reflective structure; and
at least three thermally actuated supports that movably support said reflective structure on said substrate wherein said at least three thermally actuated supports each comprise different materials from the other two supports.

9. A method of moving a reflective structure of an optical modulator, comprising:
supporting said reflective structure on a substrate with three supports, each of said three supports including at least two materials have different coefficients of thermal expansion; and
heating one of said three supports to a predetermined temperature to move said reflective structure into a predetermined position wherein said predetermined temperature is different for each of said three supports.

10. The method according to claim 9 wherein said first and second materials are each chosen from the group of plastic, metal, semiconductor material, ceramic, and silicon.

11. The method according to claim 9 wherein said first material comprises a first layer, and wherein said second material comprises a second layer positioned on and extending along said first layer.

12. The method according claim 9 wherein said supports are nominally positioned linearly and move to a bent position when heated.

13. A method of moving a reflective structure of an optical modulator, comprising:
supporting said reflective structure on a substrate with three supports, each of said three supports including at least two materials have different coefficients of thermal expansion; and
heating one of said three supports to a predetermined temperature to move said reflective structure into a predetermined position wherein said at least two materials of each of said three supports includes material different from the other two supports.

14. A method of moving a reflective structure of an optical modulator, comprising:
supporting said reflective structure on a substrate with three supports, each of said three supports including at least two materials have different coefficients of thermal expansion; and
heating one of said three supports to a predetermined temperature to move said reflective structure into a predetermined position wherein said optical modulator comprises a plurality of reflective structures positioned on said substrate, each of said plurality of reflective structures supported on said substrate by three supports, and wherein said heating comprises heating one of said three supports of said plurality of reflective structures to a predetermined temperature to move one of said plurality of reflective structures into a corresponding predetermined position.

15. A method of moving a reflective structure of an optical modulator, comprising:
supporting said reflective structure on a substrate with three supports, each of said three supports including at least two materials have different coefficients of thermal expansion; and
heating one of said three supports to a predetermined temperature to move said reflective structure into a predetermined position wherein a complimentary metal oxide semiconductor structure is operatively connected to each of said three supports, and wherein said heating comprises applying a voltage to selected one of said complimentary metal oxide semiconductor structure to selectively heat one of said three supports.

16. A method of moving a reflective structure of an optical modulator, comprising:
supporting said reflective structure on a substrate with three supports, each of said three supports including at least two materials have different coefficients of thermal expansion; and
heating one of said three supports to a predetermined temperature to move said reflective structure into a predetermined position wherein said heating comprises increasing a temperature of said supports by a temperature change in a range of one to four hundred degrees Kelvin.

17. A method of moving a reflective structure of an optical modulator, comprising:
supporting said reflective structure on a substrate with three supports, each of said three supports including at least two materials have different coefficients of thermal expansion; and
heating one of said three supports to a predetermined temperature to move said reflective structure into a predetermined position wherein said heating comprises utilizing a 5×7 micrometer tungsten heater.

18. A method of moving a reflective structure of an optical modulator, comprising:
supporting said reflective structure on a substrate with three supports, each of said three supports including at least two materials have different coefficients of thermal expansion; and
heating one of said three supports to a predetermined temperature to move said reflective structure into a predetermined position wherein said heating comprises utilizing power in a range of 0.1 to 2.5 microwatts per degree Kelvin temperature raise.

19. A thermally actuated movable micro-mirror, comprising:
a micro-mirror structure having four corners; and
four movable bilayer supports operatively connected to a corner of said micro-mirror structure, said movable bilayer supports each including a first layer of material having a first coefficient of thermal expansion and a second layer of material having a second coefficient of thermal expansion different from said first coefficient of thermal expansion.

20. The mirror according to claim 19 wherein said bilayer supports are nominally positioned linearly and bend when heated, wherein an amount of said bend is proportional to a difference between said first and second coefficients of thermal expansion.

21. The mirror according to claim 19 wherein said bilayer supports are nominally positioned linearly and bend when heated, wherein an amount of said bend is proportional to a temperature to which each support is heated.

22. The mirror according to claim 19 wherein each of said bilayer supports comprises an elongate member connected at a first end to a substrate and connected at a second end to a corner of said micro-mirror structure.

23. A reflection device, comprising:
means for reflecting light; and
three thermally actuated means for supporting said means for reflecting light comprises an array of micromirrors, wherein each of said thermally actuated means for supporting comprises an elongate member including a first layer and a second layer both extending alone a length of said elongate member, said first and second layers defining a coefficient of thermal expansion mismatch between.

24. The device according to claim 23 wherein each of said three elongate members are secured at a first end to said means for reflecting light and secured at a second end to a support.

25. The device according to claim 24 wherein each of said three elongate members are operatively connected to a heater at their second end.

26. A reflection device, comprising:

means for reflecting light; and three thermally actuated means for supporting said means for reflecting, wherein each of said three thermally actuated means for supporting comprise an elongate member including a first layer and a second layer both extending along a length of said elongate member, said first and second layers defining a coefficient of thermal expansion mismatch therebetween and wherein each of said three elongate members are secured at a first end to said means for reflecting light and secured at a second end to a support and wherein each elongate members are operatively connected to a tungsten resistive pathway at their second end.

27. The device according to claim 25 wherein each of said three elongate members bend along their length with respect to a nominal position when heated.

28. A thermally actuated mirror system, comprising:

a mirror; and at least three supports positioned around and movably supporting said mirror, said at least three supports being thermally actuated to position said mirror in a variety of predetermined x, y and z orientations.

29. The mirror according to claim 28 wherein said at least three supports each comprise a multi-material member including a first material that expands by a first expansion amount when heated and a second material that expands by a second expansion amount when heated, said second expansion amount different from said first expansion amount.

30. The mirror according to claim 28 further comprising a fourth support, said four supports equally positioned around a perimeter of said mirror.

31. The mirror according to claim 29 wherein said first material comprises a first layer of said member and said second material comprises a second layer of said member, said first and second layers both extending along a length of said member.

32. The mirror according to claim 28 wherein said mirror is angularly positioned with respect to an initial position at a first angle in a range of one to forty-five degrees with respect to an x axis, at a second angle in a range of one to forty-five degrees with respect to a y axis, and at a third angle in a range of one to forty-five degrees with respect to a z axis.

33. The mirror according to claim 28 wherein said at least three supports are positioned within a perimeter of said mirror, and wherein said mirror system includes a plurality of mirrors positioned substantially directly adjacent one another.

* * * * *

UNITED STATES PATENT AND TRADEMARK OFFICE
CERTIFICATE OF CORRECTION

| | | |
|---|---|---|
| PATENT NO. | : 7,079,300 B1 | Page 1 of 1 |
| APPLICATION NO. | : 11/045710 | |
| DATED | : July 18, 2006 | |
| INVENTOR(S) | : Govyadinov et al. | |

It is certified that error appears in the above-identified patent and that said Letters Patent is hereby corrected as shown below:

In the Claims

Col. 6 (line 64), delete "alone" and insert therefor --along--.

Signed and Sealed this

Nineteenth Day of June, 2007

JON W. DUDAS
*Director of the United States Patent and Trademark Office*